United States Patent
Jaques Bibette et al.

(10) Patent No.: US 7,214,717 B1
(45) Date of Patent: May 8, 2007

(54) POLYDISPERSE DOUBLE EMULSION, CORRESPONDING MONODISPERSE DOUBLE EMULSION AND METHOD FOR PREPARING THE MONODISPERSE EMULSION

(75) Inventors: Jérôme Michel Jaques Bibette, Bordeaux (FR); Fernando Leal Calderon, La Brede (FR); Philippe Gorria, Merignac (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 512 days.

(21) Appl. No.: 10/088,651

(22) PCT Filed: Sep. 4, 2000

(86) PCT No.: PCT/FR00/02434

§ 371 (c)(1),
(2), (4) Date: Jun. 20, 2002

(87) PCT Pub. No.: WO01/21297

PCT Pub. Date: Mar. 29, 2001

(30) Foreign Application Priority Data

Sep. 20, 1999 (FR) .................................. 99 11745

(51) Int. Cl.
*B01F 3/00* (2006.01)
*B01F 17/00* (2006.01)
(52) U.S. Cl. ............................ 516/54; 516/73; 516/76; 516/929; 516/930; 366/176.1; 366/176.3; 366/180.1
(58) Field of Classification Search .................. 516/54, 516/73, 76, 929, 930; 366/176.1, 176.3, 366/180.1
See application file for complete search history.

(56) References Cited

U.S. PATENT DOCUMENTS

| 5,242,964 | A | * | 9/1993 | Bibette et al. | ........... 252/62.54 |
| 5,332,595 | A | * | 7/1994 | Gaonkar | ..................... 426/602 |
| 5,656,323 | A | * | 8/1997 | Underdown | ................. 426/603 |
| 5,938,581 | A | * | 8/1999 | Bibette et al. | .............. 516/929 |
| 6,627,603 | B1 | * | 9/2003 | Bibette et al. | .................. 514/3 |
| 2004/0116541 | A1 | * | 6/2004 | Calderon et al. | ............. 516/54 |

FOREIGN PATENT DOCUMENTS

| WO | WO 97/38787 | 10/1997 |
| WO | WO 99/07463 | 2/1999 |

* cited by examiner

*Primary Examiner*—Daniel S. Metzmaier
(74) *Attorney, Agent, or Firm*—Young & Thompson (57) ABSTRACT

A fractionable polydisperse stable double oil-in-water emulsion, having 50 to 95 wt. % relative to the total weight of the double emulsion, droplets of an invert monodisperse emulsion Ei dispersed in a continuous aqueous phase. The continuous aqueous phase includes a polysaccharide thickening agent in a proportion of 1 to 10 wt. % relative to the total weight of the continuous aqueous phase, a water-soluble ethylene oxide and propylene oxide block copolymer as surfactant, and an osmotic pressure balancing agent. The emulsion Ei has a viscosity not higher than the viscosity of the continuous aqueous phase and has 50 to 95 wt. %, relative to the total weight of Ei, droplets of an internal aqueous phase dispersed in an oily phase. The internal aqueous phase includes an active hydrophilic substance and the oily phase includes poly glycerol polyricinoleate as surfactant.

9 Claims, 3 Drawing Sheets

333
POLYDISPERSE DOUBLE EMULSION, CORRESPONDING MONODISPERSE DOUBLE EMULSION AND METHOD FOR PREPARING THE MONODISPERSE EMULSION

BACKGROUND OF THE INVENTION

The invention concerns a monodisperse stable double emulsion of the water-in-oil-in-water type, its method of preparation and the polydisperse stable double emulsion used as a starting emulsion in the preparation method.

The advantage of double emulsions is widely recognised in fields as diverse as pharmaceuticals, cosmetics, pest and disease control, food and/or coatings of the paint type.

The double emulsions of the water-in-oil-in-water type allow in particular the encapsulation of various active substances at the internal aqueous phase. Under well determined conditions, it is in fact possible to cause the salting out of the encapsulated active substances whilst controlling their release kinetics.

The preparation of stable double emulsions of the water-in-oil-in-water type comprising an active substance in their internal aqueous phase is problematic. The development of such emulsions is generally achieved by trial and error on the basis of empirical rules according to the constituents present in the different phases. In the art, monodisperse double emulsions are particularly sought because of their homogeneity: in particular they allow a regular salting out of the active materials.

Various methods of preparing monodisperse emulsions are known: a first method is that described in EP 442 831 and EP 517 987.

This method involves the fractionation of a starting polydisperse primary emulsion, by successive creamings. It is lengthy and tedious and not easily applicable on an industrial scale. A second method is described in FR 97 00 690 or in International Application WO 97/38787. It consists of subjecting a starting viscoelastic primary emulsion to a controlled shearing so that the same maximum shearing is applied to all the emulsion. This method has various advantages and in particular allows control over the size of the droplets of the monodisperse emulsion obtained.

When one or other of these methods is applied to a double emulsion, it is essential not to introduce the destruction of the double emulsion by causing for example the coalescence of the droplets forming the emulsion or the premature leakage of the active principle.

Under these circumstances, it will be understood that the development of a double emulsion of the water-in-oil-in-water type which is both stable and fractionatable is extremely tricky. It must be understood that, in the context of the invention, fractionatable emulsion means an emulsion which it is possible to process according to the methods described above with a view to obtaining an emulsion, of the same nature (of the water-in-oil-in-water type), with the same formulation (same compositions of the different phases), and which is both stable and monodisperse.

SUMMARY OF THE INVENTION

In the context of the present invention, the double emulsion of the water-in-oil-in-water type consists of droplets of a monodisperse inverse emulsion Ei, dispersed in a continuous aqueous phase (or external aqueous phase), the emulsion Ei itself consisting of droplets of an internal aqueous phase dispersed in an oily phase.

DETAILED DESCRIPTION OF THE INVENTION

According to the invention, the term monodisperse characterises the emulsions for which the granulometric distribution of the dispersed phase droplets is very narrow.

It is considered that the distribution is very narrow when the polydispersity is less than or equal to 30%, and preferably around 5 to 25%, for example between 10 and 20%.

In the context of the invention, the polydispersity is defined as the ratio of the standard deviation of the Gaussian curve representing the variation in the volume occupied by the dispersed material as a function of the diameter of the droplets to the mean diameter of the droplets.

Thus the expression "monodisperse inverse emulsion Ei" designates an emulsion of the water-in-oil type consisting of droplets of water dispersed in oil, for which the granulometric distribution of the water droplets is very narrow (polydispersity less than 30%).

According to a first aspect, the present invention provides a polydisperse double emulsion of the water-in-oil-in-water type which is stable and fractionatable. In this double emulsion, the distribution of the diameter of the droplets of emulsion Ei dispersed in the continuous aqueous phase is wide whilst the distribution of the diameter of the internal aqueous phase droplets dispersed in the oily phase of the emulsion Ei is narrow.

More precisely, the fractionatable double emulsion of the invention consists of 50 to 95% by weight, with respect to the total weight of the double emulsion, of droplets of a monodisperse inverse emulsion Ei, dispersed in a continuous aqueous phase;

- the continuous aqueous phase comprising a polysaccharide thickening agent at 1 to 10% by weight with respect to the total weight of the continuous aqueous phase; a water-soluble sequenced copolymer of ethylene oxide and propylene oxide by way of surfactant; and an osmotic pressure balancing agent;
- the emulsion Ei having a viscosity less than or equal to the viscosity of the continuous aqueous phase and consisting of 50 to 95% by weight, with respect to the total weight of Ei, of droplets of an internal aqueous phase dispersed in an oily phase;
- the internal aqueous phase comprising at least one hydrophilic active substance;
- the oily phase comprising polyglycerol polyricinoleate by way of surfactant.

The double emulsion of the invention comprises 50 to 95% by weight, preferably at least 60% by weight, for example 65 to 85% by weight, with respect to the total weight of the double emulsion, of droplets of emulsion Ei.

Examples of polysaccharide thickening agents which can be used according to the invention are Irish moss, gum tragacanth, starch and its derivatives, cellulose and its derivatives (and more particularly hydroxyethylpropylcellulose, hydroxybutylmethylcellulose, hydroxypropylmethylcellulose, hydroxyethylcellulose or carboxymethylcellulose), xanthan gum, guar gum, carrageenans and alginates.

The preferred thickening agents are alginates, which are polymer salts of the linear type comprising β-(1→4)-D-mannosyluronic acid and α-(1→4)-L-gulosyluronic acid units.

Amongst these there are particularly preferred the alginates with a mean molar mass of between 1000 and 10,000 g/mol, better still between 3000 and 6000 g/mol.

The quantity of thickening agent is limited according to the invention; it should not exceed 10% by weight with respect to the total weight of the continuous aqueous phase. Preferably, the thickening agent content is between 1 and 5% by weight with respect to the total weight of the continuous aqueous phase, better still between 1 and 3% by weight, an appreciably preferred value being around 1.5% by weight.

The surfactants of the sequenced copolymer of ethylene oxide and propylene oxide type are widespread in the art.

It is essential according to the invention for the said copolymer to be water-soluble. Preference is given to copolymers having an HLB greater than 15, better still greater than 20 and for example at least 25. The term HLB (Hydrophilic Lipophilic Balance) designates the ratio of the hydrophilia of the polar groups of the surfactant molecules to the hydrophobia of their lipophilic part. HLB values are notably reported in various basic manuals such as the "Handbook of Pharmaceutical Excipients", The Pharmaceutical Press, London 1994.

According to a preferred embodiment of the invention, there is used as a preferred sequenced copolymer a copolymer complying with the formula (I):

$$\text{H—(OCH}_2\text{CH}_2)_a\text{—(O—CH(CH}_3\text{)—CH}_2)_b\text{—(OCH}_2\text{CH}_2)_a\text{—OH} \quad (I)$$

in which a is an integer between 50 and 120, preferably between 70 and 110; and b is an integer between 20 and 100, preferably between 30 and 70.

Such polymers are sold by ICI under the brand name Synperonic PE®.

Amongst these, those having a molar mass of between 2000 and 15,000 g/mol, preferably between 5000 and 14,000 g/mol, preferably between 8000 and 12,000 g/mol, will advantageously be selected.

The kinematic viscosity of the polymers of the Synperonic PE® type is preferably between 150 and 1200 $mm^2 \cdot s^{-1}$ at 100° C., better still between 500 and 1100 $mm^2 \cdot s^{-1}$.

Poloxamer 188 of formula (I) above, in which a=75 and b=30, is more particularly preferred.

The quantity of surfactant copolymer which is to be used is easily determined by a person skilled in the art using his basic knowledge of the art, according to the nature of the said copolymer, as well as the nature of the different constituents present.

When the surfactant copolymer complies with formula (I) above in the presence of an alginate in the continuous aqueous phase, by way of thickening agent, a copolymer content varying between 3 and 10%, for example between 3 and 8% by weight with respect to the total weight of the continuous aqueous phase, is particularly appropriate.

The presence of an agent balancing the osmotic pressure in the continuous aqueous phase is an essential characteristic of the invention. According to the invention, the osmotic pressure balancing agent is a hydrophilic substance with no surface activity.

By way of balancing agents which can be used according to the invention, a person skilled in the art will be able to use any one of the balancing agents normally used in the art.

Particularly preferred examples of these are sorbitol, glycerol and the mineral salts such as ammonium salts and alkali or alkaline earth metal salts.

According to a preferred embodiment of the invention, use is made of a monosaccharide glucid, such as fructose, lyxose, arabinose, ribose, xylose, glucose, altrose, mannose, idose, galactose, erythrose, threose, sorbose, fucose or rhamnose, glucose being clearly preferred.

A person skilled in the art will easily determine the concentration of osmotic pressure balancing agent according to the concentration of active substance present in the internal aqueous phase.

More precisely, the concentration of balancing agent will be determined so as to ensure osmotic balance between the internal aqueous phase and the continuous aqueous phase. It depends on the osmolality of the hydrophilic active substance or substances (present in the internal aqueous phase) as well as the osmolality of the said balancing agent in the continuous aqueous phase.

The emulsion Ei comprises 50 to 95% by weight, with respect to the total weight of Ei, preferably at least 60% droplets, for example between 60 and 80% by weight, of an internal aqueous phase. This droplet concentration is essential for procuring sufficient viscosity for the emulsion Ei.

The fractionatable character of the resulting double emulsion and the possibility of preparing a monodisperse double emulsion in fact requires the viscosity of the emulsion Ei to be less than or equal to the viscosity of the continuous aqueous phase. By way of indication the viscosity of the continuous aqueous phase varies between 10 and 10,000 cp.

The nature of the oily phase of the emulsion Ei is not determinant according to the invention, provided that the viscosity characteristics are ensured and in so far as it contains polyglycerol polyricinoleate as a surfactant.

The polyglycerol polyricinoleate complies with the formula:

$$R_1O\text{—(CH}_2\text{—CH(OR}_2\text{)—CH}_2O)_n\text{—}R_3 \quad (II)$$

where n is equal to 2 to 12;

$R_1$, $R_2$ and $R_3$ each represent, independently, H or a radical derived from ricinoleic acid of formula (III), at least one representing this derivative:

$$\text{H—[O—CH((CH}_2)_5\text{CH}_3)\text{—CH}_2\text{—CH=CH—(CH}_2)_7\text{—CO]}_m\text{—} \quad (III)$$

where m is equal to 2 to 10.

Preferably, n=2–10 and m=2–10; more preferentially, n=2–5 and m=4–10.

Examples of commercially available polyglycerol polyricinoleate are Admul Wol 1403 (Quest), Radiamuls Poly 2253 (Fina) and Grindsted PGPR 90 (Danisco).

The polyglycerol polyricinoleates preferably used according to the invention are those by which n varies between 2 and 5 (and is for example 3) and m varies between 5 and 10 (and is for example 7).

According to a preferred variant of the invention, the oily phase comprises 60 to 99% by weight of polyglycerol polyricinoleate.

The oily phase generally comprises one or more oils whose nature is not critical.

"Oil" means according to the invention any hydrophobic liquid substance, insoluble or only a little soluble in water, able to be put in an aqueous emulsion in the presence of polyglycerol polyricinoleate as a surfactant.

Such a hydrophobic and insoluble substance can for example be an organic polymer such as a polyorganosiloxane, a mineral oil such as hexadecane, a vegetable oil such as soya or ground nut oil or liquid crystals (lyotropic or thermotropic).

Preferably, the oily phase contains an aliphatic, cyclic and/or aromatic $C_8$–$C_{30}$ hydrocarbon. By way of example, the oily phase comprises dodecane.

By way of example, the oily phase comprises 60 to 99% by weight polyglycerol polyricinoleate and 1 to 40% by weight dodecane.

The internal aqueous phase comprises at least one water-soluble active substance.

Such active substances are preferably in the form of water-soluble polymers or salts.

Nevertheless, it may be a case of any type of active substance generally used in one or more of the pharmaceutical, cosmetic, pest and disease control, food and/or paint fields.

It can thus be chosen from amongst vitamins (E, C), enzymes, insulin, analgesics, antimitotic, anti-inflammatory or antiglaucomatous agents, vaccines, anticancer agents, narcotic antagonists, detoxification agents (salicylates, barbiturates), depilatories, taste correcting or masking agents, water-soluble salts, acids, bases, vinegar, glucose, colorants, preservatives or mixtures thereof.

When the active substance is not in the form of an organic or mineral salt or water-soluble polymer, it is advantageous to add to the said internal aqueous phase a salt such as an alkaline metal chloride (NaCl or KCl) or a water-soluble polymer such as an alginate, hydroxyethylcellulose, carboxymethylcellulose or a poly(acrylic) acid.

The concentration of active substance depends on the nature of the active substance and the contemplated application.

The double emulsion of the invention can be prepared according to a method consisting of:

a—dispersing, in a conventional fashion, an aqueous solution $A_1$ comprising at least one hydrophilic active substance in an oily phase comprising polyglycerol polyricinoleate as surfactant, so as to obtain a stable inverse emulsion of the oil in water type, the quantity of aqueous phase $A_1$ being chosen so as to result in an inverse emulsion comprising 50 to 95% by weight of droplets of internal aqueous phase;

b—subjecting the emulsion obtained at the previous step to a controlled shearing so that the same maximum shearing is applied to all the emulsion, so as to obtain the corresponding monodisperse inverse emulsion;

c—adding, drop by drop, under constant stirring, the monodisperse emulsion resulting in an aqueous phase $A_2$ comprising 1 to 10% by weight of a polysaccharide thickening agent; a sequenced copolymer of ethylene oxide and propylene oxide, by way of surfactant; and an osmotic pressure balancing agent, the said aqueous phase $A_2$ having a viscosity at least equal to the viscosity of the monodisperse emulsion.

At step a) the emulsification is implemented in a conventional fashion. When the aqueous phase $A_1$ is dispersed in the oily phase, the oily phase is maintained under stirring by the use of any one of the devices normally used in the art.

Amongst known devices, preference is given to mechanical shearing agitators whose geometry provides a certain evenness of shearing in order to avoid the formation of droplets which are excessively small and notably with a diameter less than 1 µm.

At step b), the inverse emulsion obtained at step a), which is polydisperse, is converted into a monodisperse inverse emulsion. The technique used to do this is the one described in International Application WO 97/38787. It is repeated below.

At step c), it is essential according to the invention to ensure that each drop of monodisperse inverse emulsion obtained at the previous step b) is incorporated in the continuous phase (aqueous phase $A_2$) before adding the following drop. This avoids the formation of multiple droplets of emulsion in dispersion in the continuous phase $A_2$, a multiple emulsion being defined as the superimposition of more than two emulsions.

So as to meet this requirement, a person skilled in the art will regulate the rate of introduction of the drops according to the type of agitator used and the efficacy of the stirring.

Advantageously, the continuous phase $A_2$ is kept under stirring by the action of a colloid mill. By way of indication, the speed of rotation of the blades is less than 1 revolution per second and the rate of introduction of the drops is kept below 1 drop per second.

It must be understood however that, according to the invention, the continuous aqueous phase $A_2$ must not be stirred too vigorously, so as not to cause the formation of droplets of emulsion with a diameter of less than 1 µm.

The emulsion obtained according to this method is polydisperse, that is to say the distribution of the diameters of the droplets of inverse emulsion Ei is wide, the polydispersity being greater than 30%.

The emulsion obtained is also viscoelastic.

The term viscoelastic has the meaning generally attributed to it in the art. In general terms, a material is said to be viscoelastic when, under the effect of shearing, it has both the characteristics of a purely elastic material, that is to say it is capable of storing energy, and the characteristics of a purely viscous material, that is to say it is also capable of dissipating energy.

According to the invention, the viscoelasticity domain is delimited by the following equations (1) and (2) showing the variations in the elastic modulus G' and the dissipation modulus G":

$$1.10^{-2} \text{ dyne/c+m}^2 (1.10^{-3} \text{ N/m}^2) \leqslant (G'^2 + G''^2)^{+1/2}$$
$$\leqslant 1.10^8 \text{ dyne/cm}^2 (1.10^7 \text{ N/m}^2). \quad (1)$$

$$\frac{G'}{G''} \geq 0.01 \quad (2)$$

G' and G" being measured at the maximum shearing level to which it is intended to subject the primary emulsion.

Preferably, the moduli G' and G" satisfy the following equations (3) and (4).

$$1 \text{ dyne/cm}^2 (1.10^{-1} \text{ N/m}^2) \leq (G'^2 + G''^2)^{+1/2} \leq 1.10^4 \text{ dyne/cm}^2 (1.10^3 \text{ N/m}^2) \quad (3)$$

$$0.1 \leq \frac{G'}{G''} \leq 10 \quad (4)$$

According to a second of its aspects, the invention concerns a method of preparing a double emulsion of the water-in-oil-in-water type, which is stable and monodisperse, starting from the corresponding polydisperse double emulsion of the invention.

This method comprises the essential step d) consisting of subjecting the polydisperse emulsion obtained at the end of the previous step c) to a controlled shearing so that the same maximum shearing is applied to all the emulsion. The technique used to do this is the same as at step b) above, namely the one set out in International Application WO 97/38787. This technique is now disclosed in detail.

It can for example be envisaged subjecting all the emulsion to a constant shearing level.

However, the invention does not intend to limit itself to this particular embodiment.

In fact, the shearing level can be distinct, at a given time, for two points of the emulsion.

By varying the geometry of the device used for generating the shearing forces, it is possible to modulate the shearing level applied to the emulsion in time and/or in space.

Provided that the emulsion is flowing when subjected to shearing, each part of the emulsion can thus be subjected to a shearing level which varies in time. The shearing is said to be controlled when, whatever the variation in time of the shearing level, this passes through a maximum value which the same for all the parts of the emulsion, at a given time, which may differ from one point to another in the emulsion.

In a preferred manner, so as to control the shearing, the polydisperse double emulsion is introduced into an appropriate device.

Appropriate devices are described in the application FR 97 00690 or in International Application WO 97/38787.

Briefly, an appropriate device is a Couette cell in which the shearing is constant, the Couette cell consisting of two concentric cylinders rotating with respect to each other.

A second device is a cell consisting of two moving parallel plates oscillating with respect to each other and between which the polydisperse double emulsion is forced.

Another device is a cell consisting of two concentric discs rotating with respect to each other and between which the polydisperse double emulsion circulates.

These cells are normally used in commercial appliances, in particular flow meters for measuring the viscoelastic properties of liquids (for example Carrimed or Rheometrics).

The maximum value of the shearing level to which the primary emulsion is subjected depends on the frequency of rotation, the frequency of oscillation and/or the amplitude of oscillation of the movement of the plates, cylinders and discs in the devices described above.

In general terms, it has been found that a high value of the maximum shearing level results in the formation of emulsions consisting of droplets of emulsion $E_i$ of very small size and having a very narrow granulometric distribution.

So as to increase the value of the maximum shearing level, a person skilled in the art can act on several parameters, namely the frequency of rotation, the frequency of oscillation and/or the amplitude of oscillation of the movement of the plates, cylinders and discs in the devices described above, and on the dimension of the respective enclosures of the different devices in the direction perpendicular to the direction of flow imposed by the movement of the surface.

It should be noted that the maximum shearing level varies linearly with the amplitude of oscillation and/or the frequency of the movement and inversely with the dimension of the enclosure in a direction perpendicular to the flow.

It is preferred that the maximum shearing level be between 1 and $1.10^5$ s$^{-1}$, preferably between 100 and 5000 s$^{-1}$, for example between 500 and 5000 s$^{-1}$.

It is important, according to the invention, for the flow of the starting polydisperse double emulsion to be homogeneous (no fractures) when it passes through any one of the devices described above.

More precisely, when the controlled shearing is carried out by putting the said emulsion in contact with a moving solid surface, a homogeneous flow is characterised by a constant velocity gradient in a direction perpendicular to the moving solid surface.

One means of controlling the flow consists of acting on the dimension d of the enclosures in the direction perpendicular to the flow imposed by the movement of the surface.

It should be noted that, in the case of the Couette device, this dimension d is defined by the difference $(R_3-R_2)$ where $R_2$ and $R_3$ are respectively the radii of the internal and external cylinders of the Couette device.

In the case of the cell consisting of two moving parallel plates oscillating with respect to each other, this dimension d is defined by the distance separating the two plates in a direction perpendicular to them.

In the case of the cell consisting of two concentric discs rotating with respect to each other, this dimension is defined by the distance separating the two discs in the direction of the axis of rotation of the moving disc.

In general terms, a heterogeneous flow can be made homogeneous by reducing the size of the enclosure and more particularly by reducing its dimension in the direction perpendicular to the direction of flow.

Thus, in the case of the three devices mentioned above, the dimension d is preferably kept below 200 µm, for example between 100 and 200 µm.

The method of the invention makes it possible to prepare double emulsions where the size of the droplets of emulsion $E_i$ have a diameter situated in the range 1 to 50 µm, notably in the range 2 to 10 µm.

The diameter of the droplets of the emulsion $E_i$ can be measured by using any one of the known methods of the prior art: two of these methods are normally used in the art. The first is phase contrast microscopy, the second is laser granulometry. A third method appropriate to the case of emulsions consisting of at least 65% by weight dispersed phase consists of filling with double emulsion a cell allowing the transmission of at least 80% of the incident light. By sending a laser beam through the cell and placing a screen on the path after the cell, a diffusion ring is noted whose position directly gives the mean diameter 2a of the droplets using the convention formula:

$$2a = \lambda \cdot (n \cdot \sin \theta/2)^{-1}$$

θ being the angle formed by the position of the ring and the initial beam,

λ being the wavelength of the light, and n being the index of refraction of the medium.

By proceeding thus, at step b) and at step d) described above, monodisperse emulsions are obtained, that is to say ones whose polydispersity is in all cases less than 30%, preferably between 5 and 25%, for example between 10 and 20% or at least between 15 and 20%.

At step b) the polydispersity characterises the distribution of the diameters of the droplets of the internal aqueous phase $A_1$.

At step d) the polydispersity characterises the distribution of the diameters of the droplets of inverse emulsion Ei.

The invention finds applications in many fields such as the pharmaceutical and cosmetic fields, the detergents field, the liquid crystal display field, the pest and disease control field and water-based paints. The emulsions of the invention are also useful in surface treatment.

The following examples, which make reference to FIGS. 1 to 5, illustrate the invention further.

Figure 1:
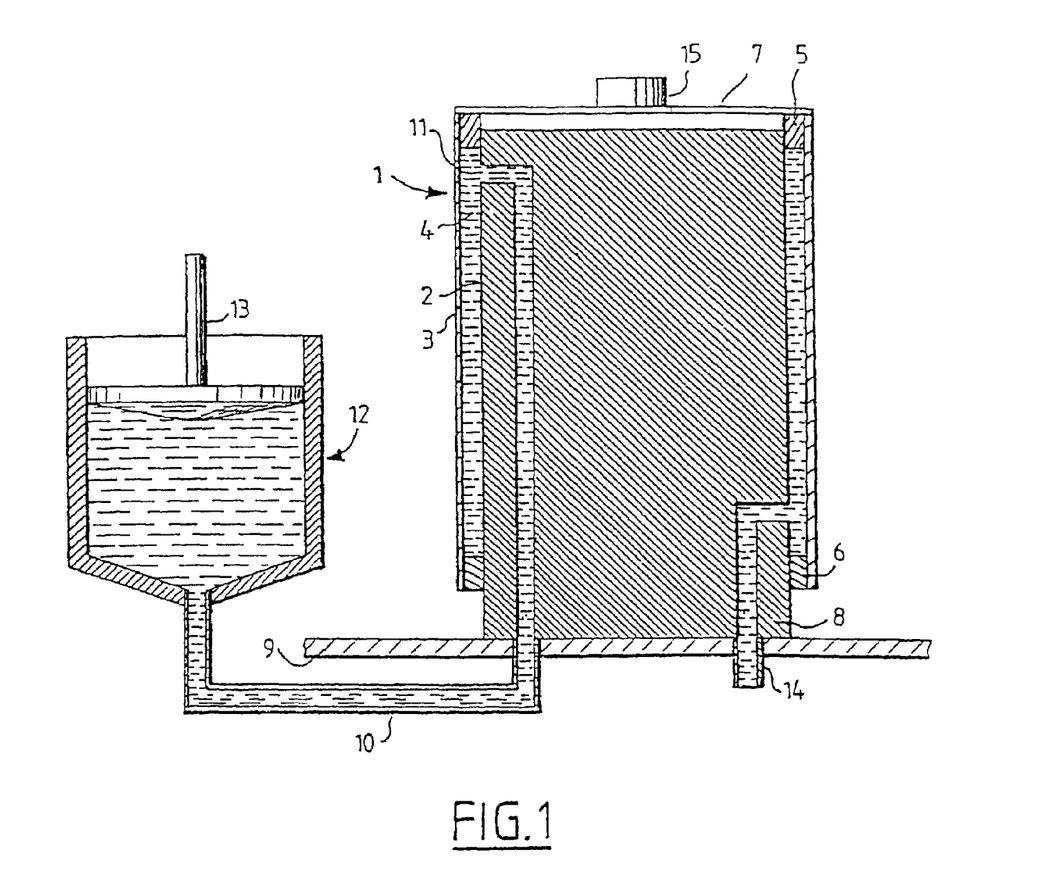
FIG. 1 shows the device used for the preparation of a monodisperse emulsion from a corresponding polydisperse emulsion.

For all the examples, the device used for the preparation of monodisperse emulsions from corresponding polydisperse emulsions is the Couette cell depicted in FIG. 1: this consists of two concentric cylinders 2 and 3 in constant rotation with respect to each other. In FIG. 1, the internal cylinder 2 is immobile whilst the external cylinder 3 has a rotation movement which is uniform with respect to a driving axis 15. The concentric cylinders 2 and 3 delimit an annular enclosure 4. At the top and bottom ends of the enclosure 4 there are disposed two annular sealed ball bearings 5 and 6. A cover 7, whose dimensions correspond to those of the external cylinder 3, closes off the top part of the device.

The concentric cylinders 2 and 3 are offset with respect to each other in the direction of the length so that the bottom part 8 of the internal cylinder rests on a flat support 9.

The Couette cell 1 depicted in FIG. 1 also comprises a polydisperse emulsion supply pipe 10 which passes through the support 9 and opens out in the top part 11 of the enclosure 4. The other end of the supply pipe is connected to a reservoir 12 containing the polydisperse emulsion. The polydisperse emulsion supply rate is controlled by a piston 13. The bottom part of the enclosure 4 diametrically opposite to the point 11 is provided with a pipe 14 discharging the polydisperse emulsion, which passes through the flat support 9.

The device of FIG. 1 allows the continuous preparation of the target monodisperse emulsion. During production, the enclosure 4 is continuously supplied with polydisperse emulsion through the pipe 10. The polydisperse emulsion circulates in the enclosure 4 whilst being subjected to shearing forces generated by the uniform rotation of the external cylinder 3 on itself.

In such a device the polydisperse emulsion is subjected to a constant shearing level, the shearing level being defined here as the ratio of the linear speed to the point of contact with the surface of the external cylinder 3 to the difference $(R_3-R_2)$ where $R_2$ and $R_3$ are respectively the radii of the internal 2 and external 3 cylinders.

The size of the droplets of emulsion $E_i$ was determined in all cases by phase contrast microscopy and by laser granulometry.

EXAMPLE 1

Preparation of a Monodisperse Double Emulsion for which the Mean Diameter of the Droplets of Emulsion $E_i$ is 0.3 μm.

In this example, the presence of an active substance in the internal aqueous phase is simulated by introducing the potassium chloride therein.

Firstly, a polydisperse inverse emulsion is prepared, water in dodecane, stabilised by polyglycerol polyricinoleate. This inverse emulsion is prepared by introducing a 0.2 M aqueous solution of potassium chloride in a continuous phase, kept under constant stirring and consisting of dodecane and polyglycerol polyricinoleate in a ratio by weight of 1:9. The quantity of aqueous solution added is such that the dispersed aqueous phase represent 80% of the total mass of the inverse emulsion.

This inverse emulsion is then sheared at a shearing level of 1050 s$^{-1}$ in a Couette device characterised by a gap d of 100 μm. The emulsion obtained $E_i^0$ is monodisperse, the mean diameter of the internal aqueous phase droplets being 0.3 μm.

An aqueous solution consisting of water, 2% by weight alginate HF120L (polysaccharide with a mean molar mass of 5400 g), 5% by weight of Synperonic PE/F 68 (sold by ICI, viscosity=1325 cp at 77° C., molar mass=8350, HLB=29 and formula I in which a=75 and b=30) and glucose in a sufficient quantity for the said aqueous solution to be 0.4 M in glucose, is poured into a colloid mill. The speed of rotation of the blades is fixed at 1 revolution per second. The monodisperse inverse emulsion $E_i^0$ prepared above is then added drop by drop to the said aqueous phase, kept under stirring. The quantity of emulsion $E_i^0$ poured into the aqueous solution of glucose, alginate and Synperonic PE/F68 is such that the ratio ø g (fraction by weight of emulsion $E_i^0$) of the mass of emulsion $E_i^0$ to the total mass of double emulsion is 0.70.

The rate of introduction of the drops of emulsion $E_i^0$ into the aqueous phase is adjusted so as to ensure the incorporation of each drop before the introduction of the following drop.

The emulsion obtained, which is a polydisperse stable double emulsion, is then introduced into a Couette cell, as depicted in FIG. 1, for which $R_3-R_2$=100 μm and in which the constant shearing level is 1050 s$^{-1}$. At the discharge from the Couette device, a monodisperse stable double emulsion is recovered, characterised by a polydispersity of less than 20%, the polydispersity being defined as the ratio of the standard deviation of the Gaussian curve representing the variation in the volume occupied by the dispersed matter as a function of the diameter of the droplets to the mean diameter of the droplets of emulsion $E_i^0$. The mean diameter of the droplets of emulsion $E_i^0$ is 4 μm.

EXAMPLE 2

Study of the Influence of the Shearing Level and of the Weight Fraction of the Internal Aqueous Phase on the Diameter of the Droplets of Emulsion $E_i$.

The weight fraction ø$_i$ of the internal aqueous phase is defined as the ratio of the internal aqueous phase weight to the total weight of emulsion $E_i$.

In Example 1, ø$_i$ is equal to 0.8.

Various monodisperse inverse emulsions $E_i$ are prepared by simple dilution in dodecane of the emulsion $E_i^0$ prepared at Example 1. In this way three emulsions with different ø$_i$ are obtained:

$E_i^1$: ø$_i$=0.75

$E_i^2$: ø$_i$=0.65

$E_i^3$: ø$_i$=0.55

By proceeding as in Example 1, there are prepared, from these monodisperse inverse emulsions, three polydisperse double emulsions with identical weight fractions ø g equal to 0.70, ø g being defined as in Example 1, that is to say the ratio of the weight of emulsion $E_i^1$, $E_i^2$ or respectively $E_i^3$ to the total mass of double emulsion. Then these polydisperse double emulsions are sheared in a Couette device.

The distance $R_3-R_2$ in the Couette cell is fixed at 100 µm. The speed of rotation of the cylinder 3 is varied so that the shearing level varies between 150 and 12,000 $s^{-1}$.

Figure 2:
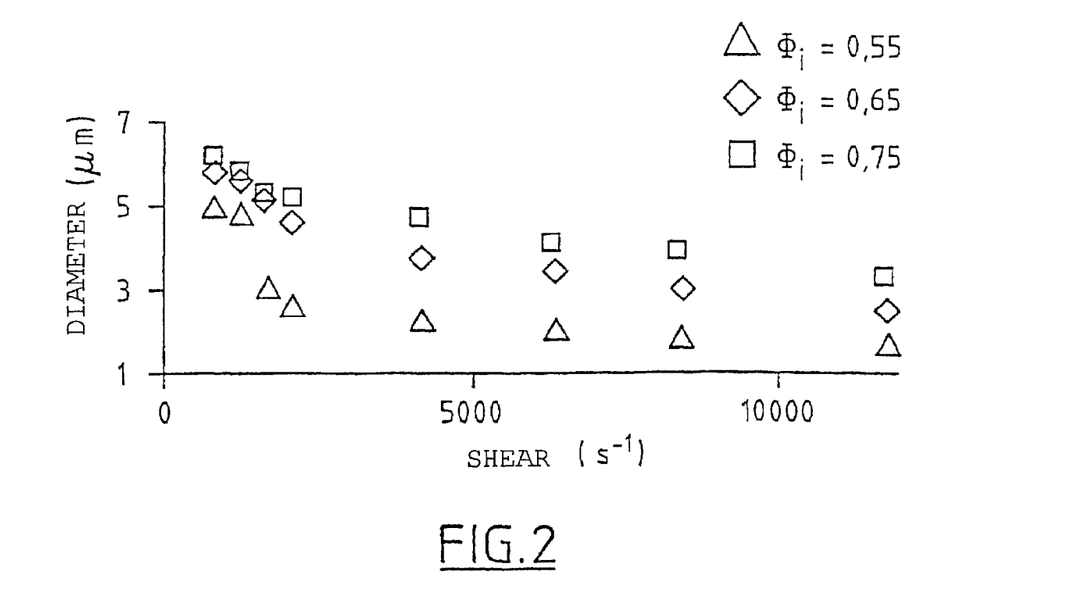
FIG. 2 shows variations in the mean diameter of droplets of an emulsion according to the shearing for three different weight fractions.

For each shearing level, the mean diameter of the droplets of emulsion $E_i$ is measured. FIG. 2 shows the variations in the mean diameter of the droplets of emulsion according to the shearing for three different weight fractions $ø_i$.

A reduction in the diameter of the droplets at a high shearing level is observed, for a given weight fraction $ø_i$.

Moreover, for a given shearing, a reduction in the diameter of the droplets by a reduction in the weight fraction $ø_i$ is observed. Thus two parameters make it possible to control the mean diameter of the droplets, namely the weight fraction of the internal aqueous phase droplets and the shearing level.

EXAMPLE 3

Study of the Influence of the Shearing Level and of the Weight Fraction of the Inverse Emulsion $E_i$.

Starting with the monodisperse inverse emulsion $E_i^2$ of $ø_i=0.65$ prepared in Example 2, various polydisperse double emulsions are prepared with varied ø g, operating as in Example 1 except that the aqueous solution used (external continuous phase) consists of water, glucose (0.4 M), 1.5% by weight alginate and 5% by weight Synperonic PE/F 68.

The respective quantities of monodisperse emulsion $E_i^2$ and of aqueous solution (continuous phase) are calculated so as to obtain different weight fractions ø g of emulsion:

For a first double emulsion $E^1$, ø g=0.70.

For a second double emulsion $E^2$, ø g=0.80.

For a third double emulsion $E^3$, ø g=0.90.

Each of the polydisperse double emulsions obtained $E^1$ to $E^3$ is introduced into a Couette cell ($R_3-R_2=100$ µm) and subjected to a given shearing level.

For each double emulsion, the influence of the shearing level on the diameter of the droplets is studied.

Figure 3:
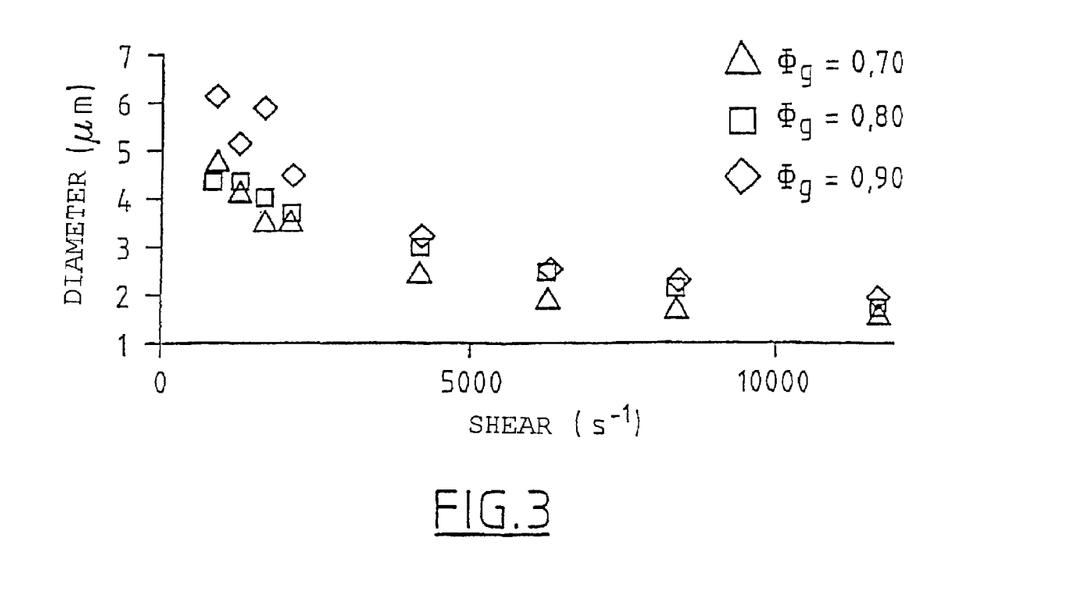
FIG. 3 shows further variations in the mean diameter of the droplets of an emulsion according to the shearing of different weight fractions.

The results are set out in FIG. 3.

Just as in the previous example, a reduction in the mean diameter of the droplets of emulsion for increasing values of the shearing level is observed.

In the case of the three emulsions $E^1$, $E^2$ and $E^3$ the curves representing the variation in the mean diameter as a function of the shearing are almost superimposable. The influence of ø g on the mean diameter of the droplets is practically negligible.

EXAMPLE 4

Study of the Influence of the Viscosity of the External Continuous Aqueous Phase.

In this example two polydisperse double emulsions with different alginate HF 120L concentrations are prepared.

Operating as in Example 1, the following two polydisperse double emulsions are prepared:

Double emulsion $E^4$:

→external continuous aqueous phase:

Percentage by weight or concentration calculated with respect to the continuous external aqueous phase

| | |
|---|---|
| glucose: | 0.4 M |
| Synperonic PE/F68: | 5% |
| alginate: | 2% |
| water: | qsp. |

→monodisperse inverse emulsion $E_i^2$: ø g=0.7

Double emulsion $E^5$:

→external continuous aqueous phase:

Percentage by weight or concentration calculated with respect to the continuous external aqueous phase

| | |
|---|---|
| glucose: | 0.4 M |
| Synperonic PE/F68: | 5% |
| alginate: | 3% |
| water: | qsp. |

→monodisperse inverse emulsion $E_i^2$: ø g=0.7

The monodisperse emulsion $E^2$ is the one prepared in Example 2. The two polydisperse double emulsions obtained are introduced into a Couette cell ($R_3-R_2=100$ µm) and subjected to a given shearing level.

For each double emulsion, the influence of the shearing level on the diameter of the droplets is studied. The results are set out in FIG. 4.

Figure 4:
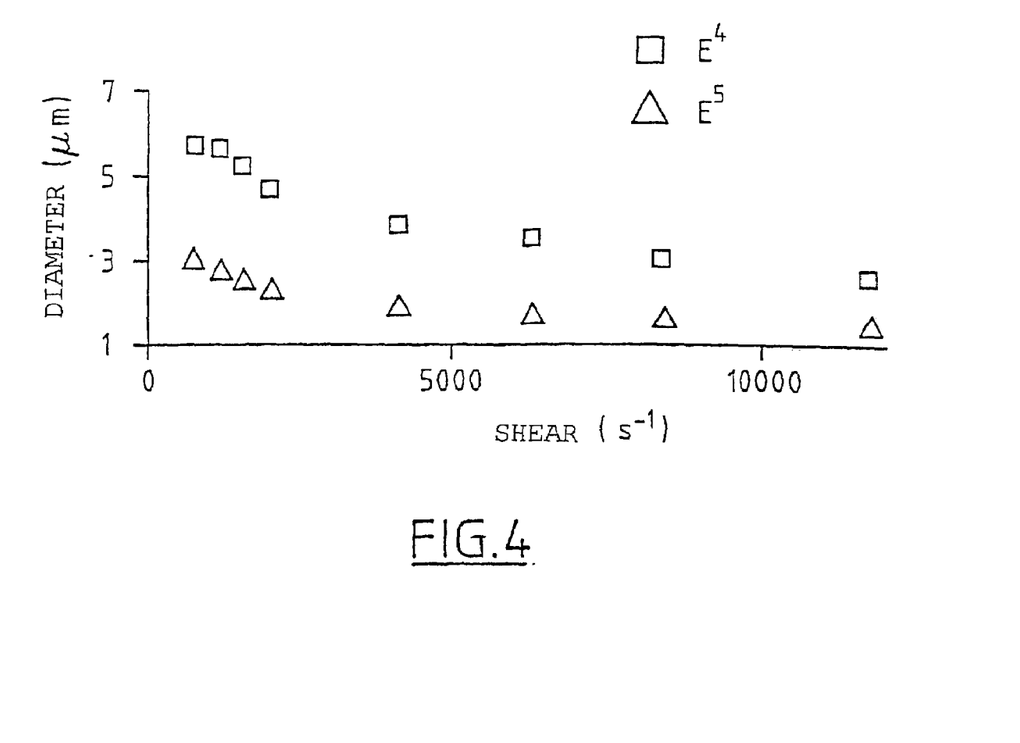
FIG. 4 shows the influence of the shearing level on the diameter of the droplet.

For a given shearing, the higher the viscosity of the continuous aqueous phase (higher quantity of alginate), the smaller the mean diameter of the droplets of emulsion.

It should be noted that, in the case of emulsion $E^4$ (alginate: 2% by weight), and for a shearing of 1680 $s^{-1}$, a very close distribution of the droplet size is obtained.

mean diameter=5.3 µm polydispersity 10.5%

COMPARATIVE EXAMPLE

Operating as in Example 1, the following double emulsion $E_c$ is prepared, defined by a weight fraction ø g of 0.9, where ø g represents the ratio of the weight of emulsion $E_i^2$ to the total weight of the double emulsion:

→external continuous aqueous phase:

Percentage by weight or concentration calculated with respect to the external aqueous phase:

| | |
|---|---|
| glucose: | 0.4 M |
| Synperonic PE/F68: | 25% |
| water: | qsp. |

→monodisperse inverse emulsion $E_i^2$ of Example 2.

In the Couette device of FIG. 1 ($R_3-R_2=100$ µm), the influence of the shearing level on the diameter of the inverse emulsion droplets is studied.

Figure 5:
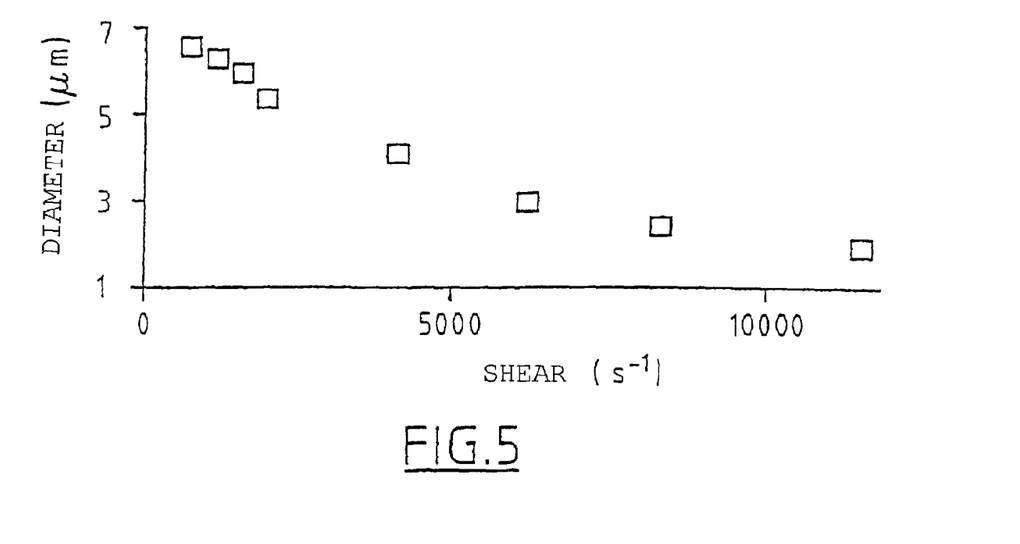
FIG. 5 further shows the variations in the mean diameter of the droplets as a function of the shearing level.

FIG. 5 shows the variations in the mean diameter of the droplets as a function of the shearing level.

However, a coalescence of the droplets is very quickly observed.

Thus the absence of alginate or the presence of an excessive quantity of Synperonic PR/F68 in the external aqueous phase results in great instability of the resulting double emulsion.

The invention claimed is:

1. A fractionatable stable double emulsion, having a polydispersity greater than 30%, of the water-in-oil-in-water type, consisting of 50 to 95% by weight, with respect to the total weight of the double emulsion, of droplets of a monodisperse inverse emulsion Ei dispersed in a continuous aqueous phase; the monodisperse inverse emulsion Ei having a polydispersity of up to and including 30%;
the continuous aqueous phase comprising an alginate thickening agent at 1 to 10% by weight with respect to the total weight of the continuous aqueous phase; a water-soluble sequenced copolymer of ethylene oxide and propylene oxide as surfactant; and an osmotic pressure balancing agent;
the emulsion Ei having a viscosity up to and including the viscosity of the continuous aqueous phase and consisting of 50 to 95% by weight, with respect to the total weight of Ei, of droplets of an internal aqueous phase dispersed in an oily phase;
the internal aqueous phase comprising at least one hydrophilic active substance;
the oily phase comprising polyglycerol polyricinoleate as surfactant; the concentration of balancing agent being sufficient to ensure osmotic balance between the aqueous phase of the emulsion Ei and the continuous aqueous phase.

2. The double emulsion according to claim 1, wherein the double emulsion comprises at least 60% by weight of droplets of emulsion Ei with respect to the total weight of the double emulsion.

3. The double emulsion according to claim 1, wherein the agent for balancing the osmotic pressure is glucose.

4. The double emulsion according to claim 1, wherein the alginate has a molar mass of between 3000 and 6000 g/mol.

5. The double emulsion according to claim 1, wherein the continuous aqueous phase comprises glucose as osmotic pressure balancing agent, the molar ratio of the glucose concentration in the continuous aqueous phase to the concentration of active substance in the internal aqueous phase being between 1.5 and 2.5.

6. The double emulsion according to claim 1, wherein the oily phase comprises 60 to 99% by weight of polyglycerol polyricinoleate and 1 to 40% by weight dodecane.

7. The double emulsion according to claim 1, wherein Ei comprises at least 60% by weight of droplets of internal aqueous phase.

8. A fractionatable stable double emulsion, having a polydispersity greater than 30%, of the water-in-oil-in-water type, consisting of 50 to 95% by weight, with respect to the total weight of the double emulsion, of droplets of a monodisperse inverse emulsion Ei dispersed in a continuous aqueous phase; the monodisperse inverse emulsion Ei having a polydispersity of up to and including 30%;
the continuous aqueous phase comprising an alginate thickening agent at 1 to 10% by weight with respect to the total weight of the continuous aqueous phase; a water-soluble sequenced copolymer of ethylene oxide and propylene oxide as surfactant; and an osmotic pressure balancing agent;
the emulsion Ei having a viscosity up to and including the viscosity of the continuous aqueous phase and consisting of 50 to 95% by weight, with respect to the total weight of Ei, of droplets of an internal aqueous phase dispersed in an oily phase;
the internal aqueous phase comprising at least one hydrophilic active substance;
the oily phase comprising polyglycerol polyricinoleate as surfactant; the concentration of balancing agent being sufficient to ensure osmotic balance between the aqueous phase of the emulsion Ei and the continuous aqueous phase,
wherein the formula of the sequenced copolymer is:

in which
a is an integer between 50 and 120; and
b is an integer between 20 and 100, and
wherein the continuous aqueous phase comprises 1 to 5% by weight, with respect to the total weight of the continuous aqueous phase, of alginate, as a thickener; and 3 to 10% by weight with respect to the total weight of the continuous aqueous phase of the sequenced polymer of said formula (I), as a surfactant.

9. The double emulsion according to claim 8, wherein the alginate has a molar mass of between 3000 and 6000 g/mol.

* * * * *